(12) United States Patent

Keller et al.

(10) Patent No.: US 12,006,201 B2

(45) Date of Patent: Jun. 11, 2024

(54) REFRIGERATOR WITH DISPENSER

(71) Applicant: BSH HAUSGERAETE GMBH, Munich (DE)

(72) Inventors: Hans Gerd Keller, Giengen (DE); Karl-Friedrich Laible, Langenau (DE); Florian Moertl, Neu-Ulm (DE); Senol Temizkan, Aalen (DE)

(73) Assignee: BSH Hausgeraete GmbH, Munich (DE)

( * ) Notice: Subject to any disclaimer, the term of this patent is extended or adjusted under 35 U.S.C. 154(b) by 907 days.

(21) Appl. No.: 16/778,881

(22) Filed: Jan. 31, 2020

(65) Prior Publication Data

US 2020/0165116 A1 May 28, 2020

Related U.S. Application Data

(63) Continuation-in-part of application No. 15/417,297, filed on Jan. 27, 2017, now Pat. No. 10,598,423.

(30) Foreign Application Priority Data

Feb. 5, 2016 (DE) ..................... 10 2016 201 782.9

(51) Int. Cl.

*B67D 1/08* (2006.01)

*F25D 31/00* (2006.01)

(52) U.S. Cl.

CPC ......... *B67D 1/0858* (2013.01); *F25D 31/002* (2013.01)

(58) Field of Classification Search

CPC ... B67D 1/0858; F25D 31/002; F25D 23/028; F25D 23/064; F25D 23/126

See application file for complete search history.

(56) References Cited

U.S. PATENT DOCUMENTS 4,311,351 A * 1/1982 Chang ................... F25D 23/064 264/45.5

4,955,675 A * 9/1990 Donaghy .............. B29C 44/588 312/321.5

(Continued)

FOREIGN PATENT DOCUMENTS

DE 102012216375 A1 * 3/2014 .............. F25C 5/005

EP 2344820 A2 * 7/2011 ........... F25D 23/028

(Continued)

OTHER PUBLICATIONS

Precast/Prestressed Concrete Institute, PCI Bridge Design Manual, Nov. 2011, Appendix B—13-14, https://www.pci.org/PCI_Docs/Design_Resources/Transportation_Resources/Double%20Tee%20Bridge%20Beams.pdf (Year: 2011).*

(Continued)

*Primary Examiner* — Elizabeth J Martin

*Assistant Examiner* — Samba Gaye

(74) *Attorney, Agent, or Firm* — Laurence A. Greenberg; Werner H. Stemer; Ralph E. Locher

(57) ABSTRACT

A refrigerator contains a dispenser for ice and/or liquid. A dispenser housing covers an opening in an outer shell of the refrigerator. The dispenser housing delimits a dispenser recess that extends outward and upward over an upper edge of the opening and is assembled from at least one main part, which extends from a lower edge of the opening over a rear wall to a front edge of a ceiling of the dispenser housing, and a filling part, which extends from the front edge to an upper edge of the opening.

20 Claims, 5 Drawing Sheets

(56) References Cited

U.S. PATENT DOCUMENTS

| | | | | |
|---|---|---|---|---|
| 7,340,915 | B2 | 3/2008 | Kwon | F25D 23/02 62/324.4 |
| 2009/0071184 | A1 * | 3/2009 | Buchstab | F25D 23/10 62/389 |
| 2009/0314025 | A1 * | 12/2009 | Kummel | F25D 23/10 62/389 |
| 2010/0200621 | A1 * | 8/2010 | Buchstab | F25C 5/22 222/638 |
| 2012/0104026 | A1 * | 5/2012 | Hortin | A47J 31/0652 99/275 |
| 2018/0024962 | A1 * | 1/2018 | Lee | G06F 3/0679 710/106 |

FOREIGN PATENT DOCUMENTS

| | | | | | |
|---|---|---|---|---|---|
| EP | 2344820 | B1 | * | 8/2012 | F25D 23/028 |
| KR | 19980083723 | A | * | 12/1998 | |

OTHER PUBLICATIONS

Translated_Peter (Year: 2014).*
Translated_Pak (Year: 1998).*
Translated_Yufa (Year: 2012).*

* cited by examiner

REFRIGERATOR WITH DISPENSER

CROSS-REFERENCE TO RELATED APPLICATION

This application is a continuation-in-part of patent application Ser. No. 15/417,297, filed Jan. 27, 2017; this application also claims the priority, under 35 U.S.C. § 119, of German patent application No. DE 10 2016 201 782, filed Feb. 5, 2016; the prior applications are herewith incorporated by reference in their entirety.

BACKGROUND OF THE INVENTION

Field of the Invention

The present invention relates to a refrigerator, in particular a domestic refrigerator, with a dispenser for ice and/or water.

Ice/water dispensers traditionally contain a dispenser housing, which is flush-mounted behind an opening in the outer shell in a heat-insulating wall of the refrigerator, usually a door, and delimits a dispenser recess in which a receptacle can be placed in order to be filled with ice and/or liquid. Passages, via which ice and/or liquid pass into the dispenser housing, are located in an upper area of the dispenser housing.

To protect fittings such as valves or flaps, which are accommodated in the upper area of the dispenser housing to control the delivery of ice or liquid and/or to prevent unnecessary air circulation between the dispenser recess and the interior of the refrigerator via the passages, it is expedient to cover this upper area. T his may be done expediently by mounting an operating component at this location, via which the functioning of the dispenser can be controlled.

The minimum number of buttons or other operating elements, which are required on the operating component in order to control the functions of the dispenser, is small and easily accommodated on an operating element, the height of which is less than that of the fittings of the upper area, and in particular less than the height of a flap on the output of an ice chute.

If the height of the operating element varies in different models of refrigerators, yet at the same time, regardless of the height of the operating element, it shall be possible to place a receptacle just below an outlet such as the output of the ice chute or the end of a water conduit, in order to limit the dropping height of the ice or water and minimize the risk of splattering, then different versions of the dispenser housing are required depending on the height of the operating element. The manufacture of several refrigerator models, which vary in the appearance of their dispenser, is thus expensive.

SUMMARY OF THE INVENTION

An object of the invention is to create a refrigerator with a dispenser, which enables different refrigerator models to be produced cost-effectively.

The object is achieved in that, in a refrigerator with a dispenser for ice and/or liquid, in which a dispenser housing covers an opening in an outer shell of the refrigerator and delimits a dispenser recess that extends upward beyond an upper edge of the opening, the dispenser housing is assembled from at least one main part, which extends from a lower edge of the opening over a rear wall to a front edge of a ceiling of the dispenser housing, and a filling part, which extends behind the outer shell from the front edge to an upper edge of the opening.

Since the filling part is provided with varying heights in different versions, a variable height of the operating component can be compensated so that the distance between a lower edge of the opening and the operating component or between the lower edge of the opening and an outlet of the dispenser can remain the same. Therefore only one identical model of main part, which can be produced cost-effectively in large quantities, is required for different models. The different models of filling components entail only relatively low costs due to their smaller dimensions and simpler construction.

The operating component may be mountable in the dispenser housing adjacent to an upper edge of the opening.

The filling part may contain a wall panel, which delimits the dispenser recess and is separated from the outer shell by a gap.

The filling part may contain ridges, which extend to the outer shell. These ridges can be used for various purposes. Ridges on the edges of the wall panel can be used for fixing the filling part on the main part or delimiting the gap from the dispenser recess; ridges may be provided away from the edges in order to attenuate vibrations in the outer shell by contact therewith or to control the penetration of foam into the gap when the housing of the refrigerator is filled with foam.

To prevent the outer shell sounding hollow when someone knocks on it at the level of the filling part, possibly causing a user to suspect an absence of insulation, the gap may be at least partially filled with expanded foam.

To ensure that the foam penetrating into the gap from outside when foam is expanded is not prevented from advancing by counter pressure from air enclosed therein, the filling part may have a ventilation passage leading into the dispenser recess.

Such a ventilation passage should be sufficiently long and narrow so that, as soon as the foam has reached it and starts to be forced into it, the foam is held for long enough until it is set hard and solidified. Such a passage may expediently be located in a mandrel, which projects into the gap from the wall panel.

The sidewalls of the main part may have a cutout in an upper front region, so that an upper region is not in direct contact with the front panel, but expanding foam can reach the gap through the cutouts.

Since according to this design, air can escape upwards from the gap while foam is penetrating into it from the sides, the ventilation passage can be dispensed with.

Further, visibly inhomogeneous deformation of the outer shell by pressure from the expanded foam can be minimized since a pressure gradient between foam in the gap and foam located around the dispenser is reduced. This is particularly important if the outer shell is made from a specular reflecting material, such as unpainted stainless steel.

In order to reduce the pressure gradient, it is further expedient if the gap is flared towards the edges, so as to facilitate propagation of high pressure of the foam surrounding the dispenser into the gap. To this effect, the outer shell being substantially flat, the wall panel should have a convex side facing the gap.

The wall panel can expediently carry holding brackets for attaching it to the sidewalls of the main part.

At least one of the aforementioned ridges may extend over the entire width of the wall panel and divide the gap into an upper, open-ended section and a lower section bounded on all sides.

When the upper section is filled with foam, the ridge can form an initial seal against the penetration of the foam. It does not have to be completely foam-tight, since the lower section of the gap can be used as a collection chamber for foam if necessary; the ridge only needs to delay the foam for long enough so that it hardens before the collection chamber is full.

A prefabricated insulation body, e.g. one that has been expanded in a hollow mold or customized from expanded material, may also be inserted into the gap, whether in order to be used as a seal against penetrating foam or merely to attenuate vibrations in it caused by contact with the outer shell.

To establish a foam-tight joint between the outer shell and the filling part, an edge strip of the outer shell angled on the upper edge of the opening can engage into a groove of the filling part.

Similarly, an edge strip of the outer shell angled on a lateral or lower edge of the opening can engage into a groove of the main part.

A foam-tight joint between main part and filling part can be established by means of a tongue-and-groove joint.

The insertion direction of the tongue-and-groove joint is preferably oriented perpendicular to the outer shell. Thus the groove of the main part, which accommodates the flange of the outer shell, and the section of the tongue-and-groove joint, which is located on the main part, is molded with an identical molding tool and removed from the mold in the same movement.

The section of the tongue-and-groove joint, which is located on the main part, is an upper area of a linear groove, the lower area of which accommodates the edge strip of the outer shell. Alternatively, one of the tongue and the groove of the tongue-and-groove joint can be formed on a side of the wall panel that faces away from the outer shell, so as to mate with other of the tongue and the groove extending along the edge of a sidewall cutout of the main portion.

Other features and advantages of the invention will emerge from the description which follows of exemplary embodiments, with reference to the attached diagrams.

Although the invention is illustrated and described herein as embodied in a refrigerator with a dispenser, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
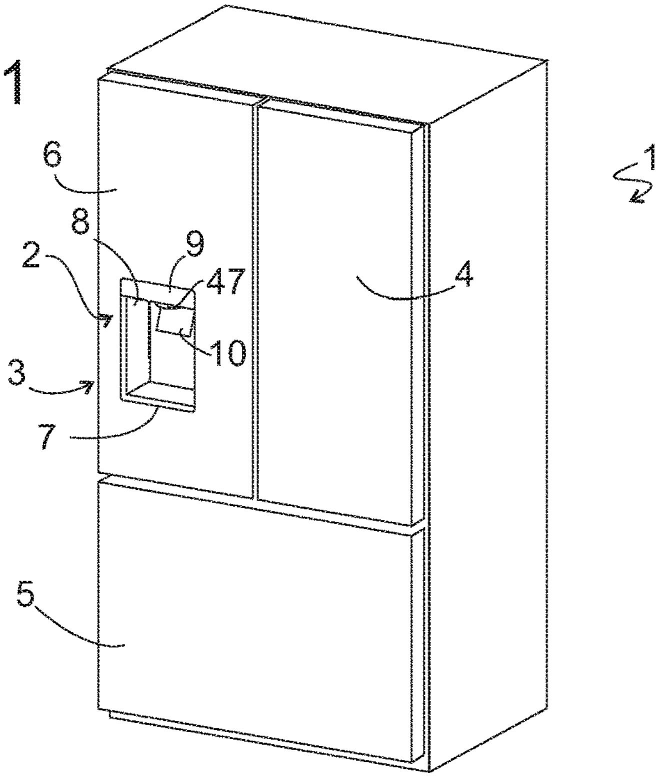
FIG. 1 is a diagrammatic, perspective, external view of a refrigerator with a dispenser according to the invention.

Referring now to the figures of the drawings in detail and first, particularly to FIG. 1 thereof, there is shown a perspective external view of a refrigerator 1 with a dispenser 2 according to the present invention. The refrigerator 1 shown here is a combination appliance with double doors 3, 4, which together close a contiguous storage area, or which each close their own storage area, and a storage area formed below the double doors as a drawer 5. The dispenser 2 is flush-mounted into the door 3 in a manner that is known per se. For this purpose an opening 7, behind which a dispenser housing 8 is installed, is cut into a metallic outer shell 6 of the door 3. The dispenser housing 8 surrounds a dispenser recess, in which a receptacle to be filled with ice or water can be placed. An upper area of the opening 7 is occupied by an operating component 9, which, in the usual way, has buttons or other control elements (not shown in FIG. 1) for controlling the output of ice and/or water by the dispenser 2 and/or an operating status indicator. The operating component 9 conceals outlets for ice and water in an upper area of the dispenser recess. A filler tube 47, which is partially visible below the operating component 9, marks the position in which a receptacle can be placed for filling. Outlets for ice and water are arranged in a manner that is known per se above the filler tube 47 in such a way that dispensed ice only touches the inner surfaces of the filler tube on the way to the receptacle, and a dispensed water stream passes freely through the filler tube 47 without touching it. An operating paddle 10 on a rear wall of the dispenser housing 8 can be activated by the receptacle placed in the recess, in order to dispense ice or water into the receptacle.

Figure 2:
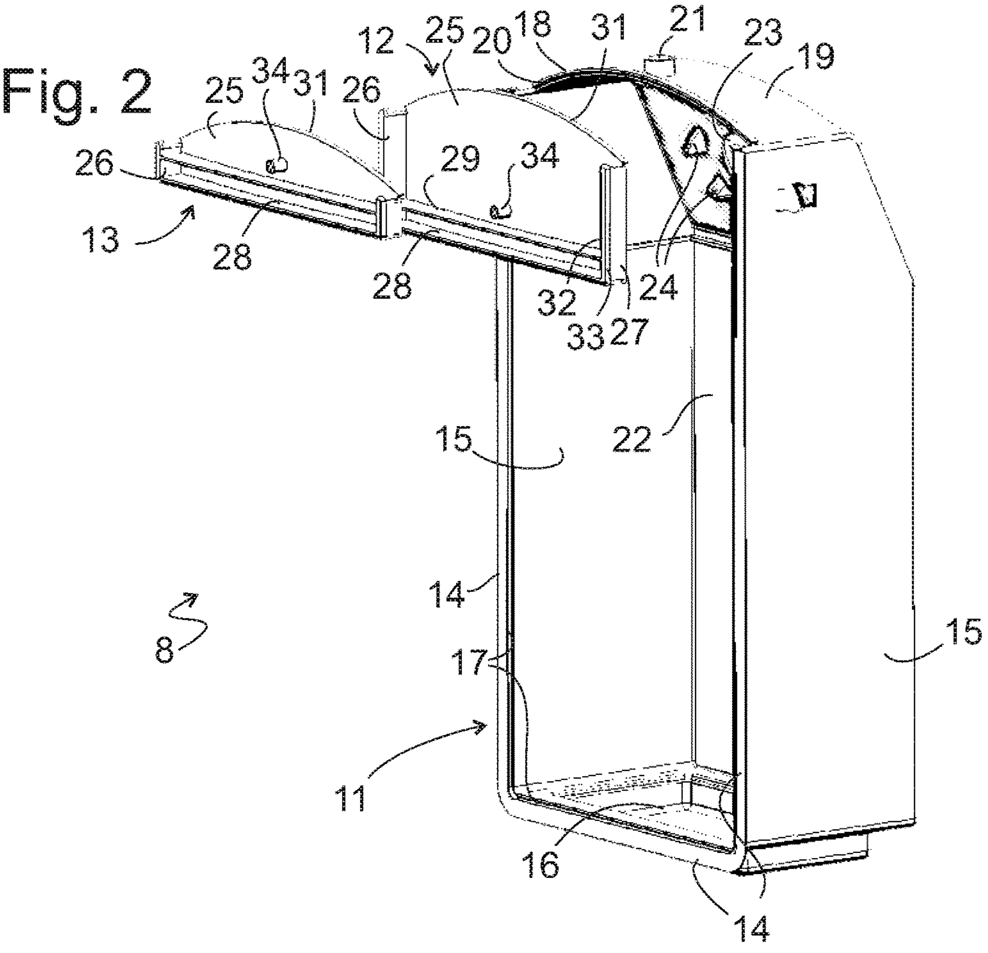
FIG. 2 is an exploded, perspective view of a main part and two different filling parts of a dispenser housing according to a first embodiment.

FIG. 2 shows a deconstructed perspective view of a main part 11 and two different filling parts 12, 13, which may optionally be assembled with the main part 11 to form the complete dispenser housing 8 according to a first embodiment of the invention. The main part 11 is essentially shaped as a cuboid with the front side open. Front edges 14 of side walls 15 and a floor plate 16 of the main part 11 extend in the same vertical plane and are each provided with a groove 17 that opens to the front.

A front edge 18 of a ceiling 19 of the main part 11 is recessed against this plane. It is likewise provided with a groove 20 that is open toward the front. A passage is made in a vertex 21 of the ceiling 19, through which, in the fully assembled appliance, a water conduit is extended to an outlet in the upper area of the dispenser housing 8, above the filler tube 47. In an inclined wall section between the ceiling 19 and a rear wall 22, a hole 23 can be seen, which will form the outlet of an ice chute, as well as projections 24 for fastening a pivoting flap for closing the hole 23 when it is not in use.

The two filling parts 12, 13 are identical in terms of their construction; they differ only in the height at which they are located. A ridge 26, 27, 28 protrudes respectively along the lateral edges and the lower edge of a side of a vertical wall panel 25 facing toward the observer; a further ridge 29 parallel to the lower edge links lateral ridges 26, 27. As can be seen more clearly in FIGS. 4, 5 and 6, a groove 30 is made in the edge of the lower ridge 28 facing toward the observer. A tongue 31 protrudes from an upper edge of the wall panel 25 on the side facing away from the observer. The function of a ventilation mandrel 34, which protrudes from the wall panel above the ridge 29, will be explained later.

The ridges 26, 27 are widened into a flange 32 on their edge facing toward the observer, from the rear side of which a tongue 33 in turn protrudes.

Figure 3:
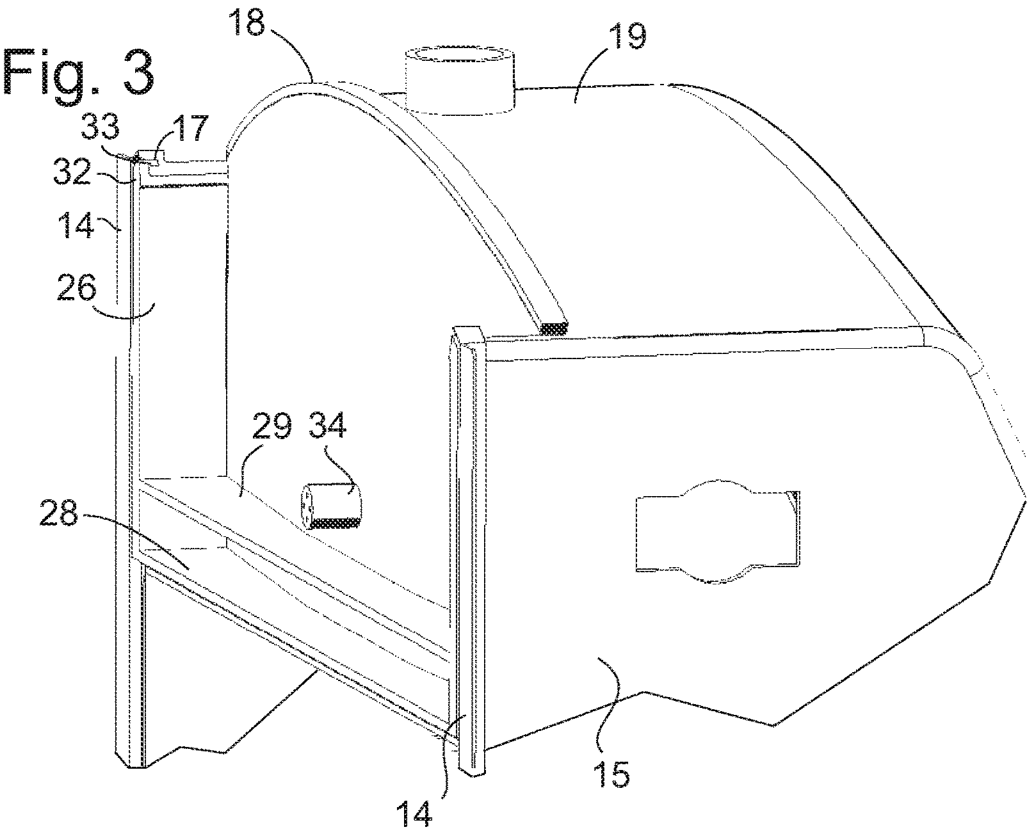
FIG. 3 is a perspective, enlarged partial view of the main part of FIG. 2 and an inserted filling part.

FIG. 3 is an enlarged view showing an upper area of the main part 11 and the filling part 12 joined to the main part 11 by the interlocking of the tongues and grooves in a direction perpendicular to the outer shell 6 and to the wall panel 25. The tongue 31 has disappeared into the groove 20 on the front edge 18 of the ceiling 19; the tongues 33 engage into the grooves 17 of the side walls 15. The interlocking can easily be seen here particularly on an angled upper end of the ridge 26. The flanges 32 and the vertices of the ridges 28, 29 are located on a plane with the front edges 14 of the side walls 15.

Figure 4:
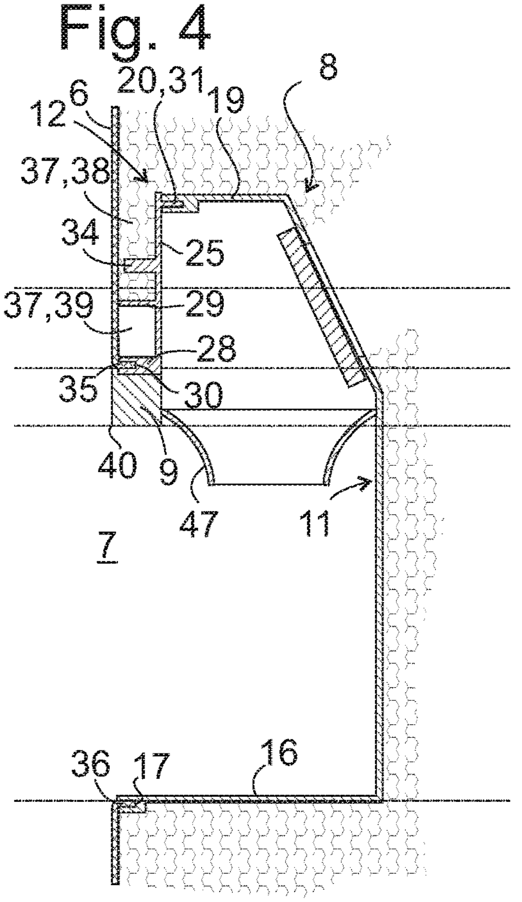
FIG. 4 is a schematic sectional view through the door of a refrigerator according to the first embodiment with a small operating component.

FIG. 4 shows a vertical section through the dispenser housing 8 already installed in the door 3. An edge strip 35, 36 of the outer shell 6 on the upper and lower edge of the opening 7 is angled in each case toward the interior of the door. The lower edge strip 36 engages into the groove 17 at the front edge of the floor plate 16. The upper edge strip 35 engages into the groove 30 of the ridge 28. A gap 37 between the wall panel 25 and the outer shell 6 above the opening 7 is divided by the ridge 29 into an upper section 38 open at the top and a lower section 39 enclosed on all sides. When, following the installation of the dispenser housing 8 and the joining of the outer shell 6 to an inner wall (not shown) of the door 3, the cavity thus obtained is filled with foam, the foam can thus penetrate unimpeded from above into the upper section 38; to reach the lower section 39, however, is only possible if the ridge 29 does not rest closely against the outer shell 6 along its entire length. Any leakage of foam is precluded both on the upper edge of the wall panel 25 by the tongue 31 being engaged in the groove 20 and on its lower edge by the edge strip 35 being engaged in the groove 30.

The operating component 9 is installed directly below the ridge 28 and closes the opening 7 above an edge 40.

Figure 5:
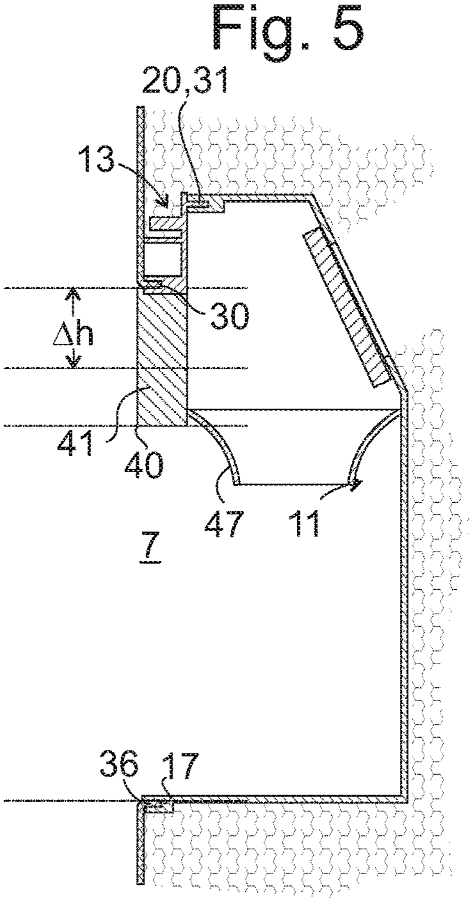
FIG. 5 is a schematic sectional view through the door of a the first embodiment with a large operating component.

FIG. 5 shows a section analogous to FIG. 4 through a dispenser housing with an operating component 41, the installation level of which is Δh higher than that of the operating component 9. The level of the opening 7 in the outer shell 6 is likewise increased by Δh; in contrast the distance between the groove 30 and the tongue 31 on the filling part 13 is Δh smaller than on the filling part 12, so that the useful level of the opening 7, between the edge 40 and the edge strip 36, is the same as in FIG. 4. The main part 11 is the same in both figures.

Figure 6:
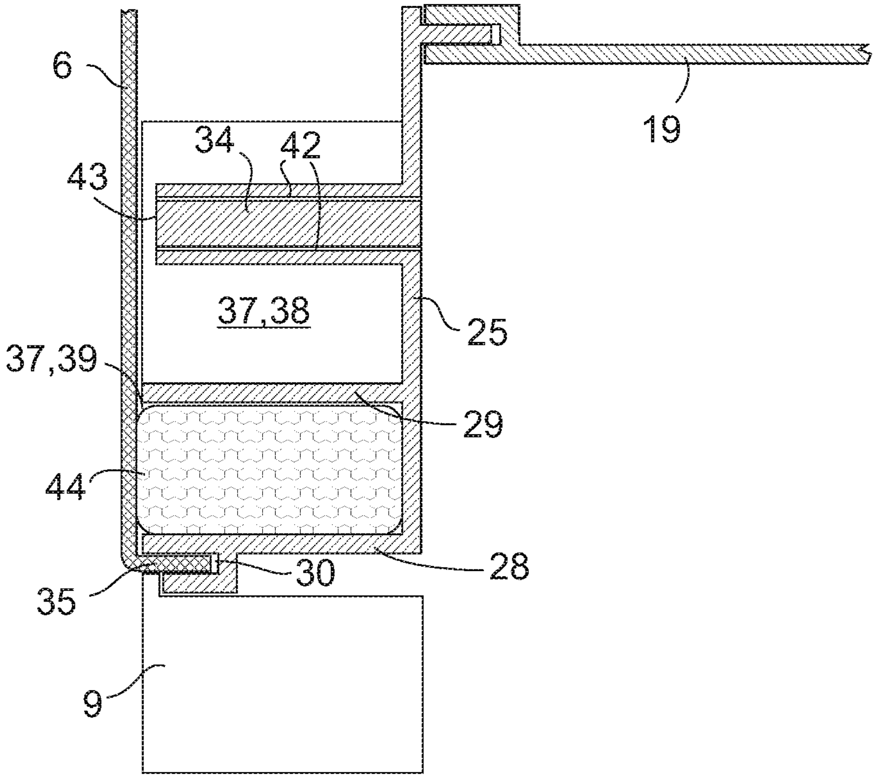
FIG. 6 is a vertical sectional view through the upper edge of the opening in the outer shell of the door and the area surrounding it according to the first embodiment.

FIG. 6 shows a further enlarged detail from FIG. 4. Narrow passages 42 can be seen here in the ventilation mandrel 34, which extend from a front surface 43 of the ventilation mandrel 34 opposite and at a short distance from the outer shell, through the wall panel 25 and into the dispenser recess. The air enclosed in the upper section 38 of the gap 37 can escape via these passages 42 while the foam is penetrating into the upper section 38. The small gap between the front surface 43 and the outer shell 6 ensures that the foam only advances to the front surface 43 when the ventilation mandrel 34 is completely surrounded by foam. The cross-section of the passages 42 is even smaller in comparison to the gap between front surface 43 and outer shell 6; if it is at or below the same order of magnitude as the bubble size of the foam, the foam cannot pass through the passages 42.

The pressure of the foam may cause the outer shell 6 to be pushed away from the ridge 29 slightly. To prevent the foam from penetrating over the ridge 29 and into the lower section 39, the latter can be filled in advance by insertion of a preformed insulation body 44, e.g. made from expanded polystyrene; it may however already be sufficient if the gap between the ridge 29 and the outer shell 6 is narrow enough to inhibit the penetration of the foam so that the quantity of foam passing through to constrict the gap is too small to fill the lower section 39.

Figure 7:
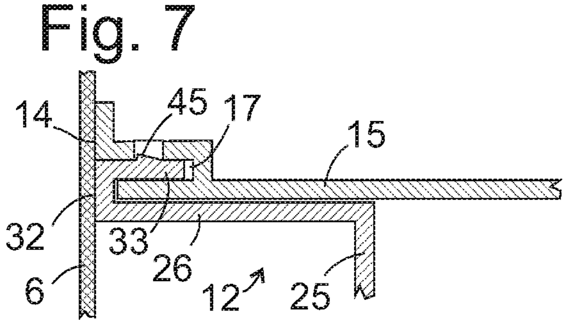
FIG. 7 is a horizontal sectional view through a lateral edge of the opening in the outer shell of the door at the level of the filling part according to the first embodiment.

FIG. 7 shows a horizontal section through the lateral ridge 26 and a section of the wall panel 25 of the filling part 12. The flange 32 and the front edge 14 of the side wall 15 rest against the outer shell 6. A latching projection 45 can be formed on the tongue 33, which securely interlocks the filling part 12 in the groove 17.

Figure 8:
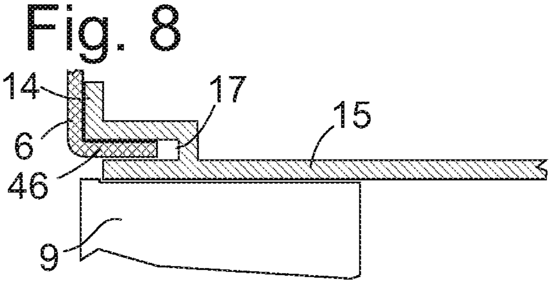
FIG. 8 is a horizontal sectional view through the lateral edge of the opening at the level of the operating component.

FIG. 8 shows a further horizontal section at the level of the opening 7 and of the operating component 9. As on the upper and lower edge of the opening, an edge strip 46 is also angled inwardly toward the interior of the door 3 on each of the lateral edges. The edge strip 46 engages into a lower area of the same groove 17, the upper area of which is filled by the tongue 32 of the filling part 12 as shown in FIG. 7. The length of the section of the groove 17, which is filled by one or the other, varies depending on the level of the opening 7 and of the filling part 12 or 13.

Figure 9:
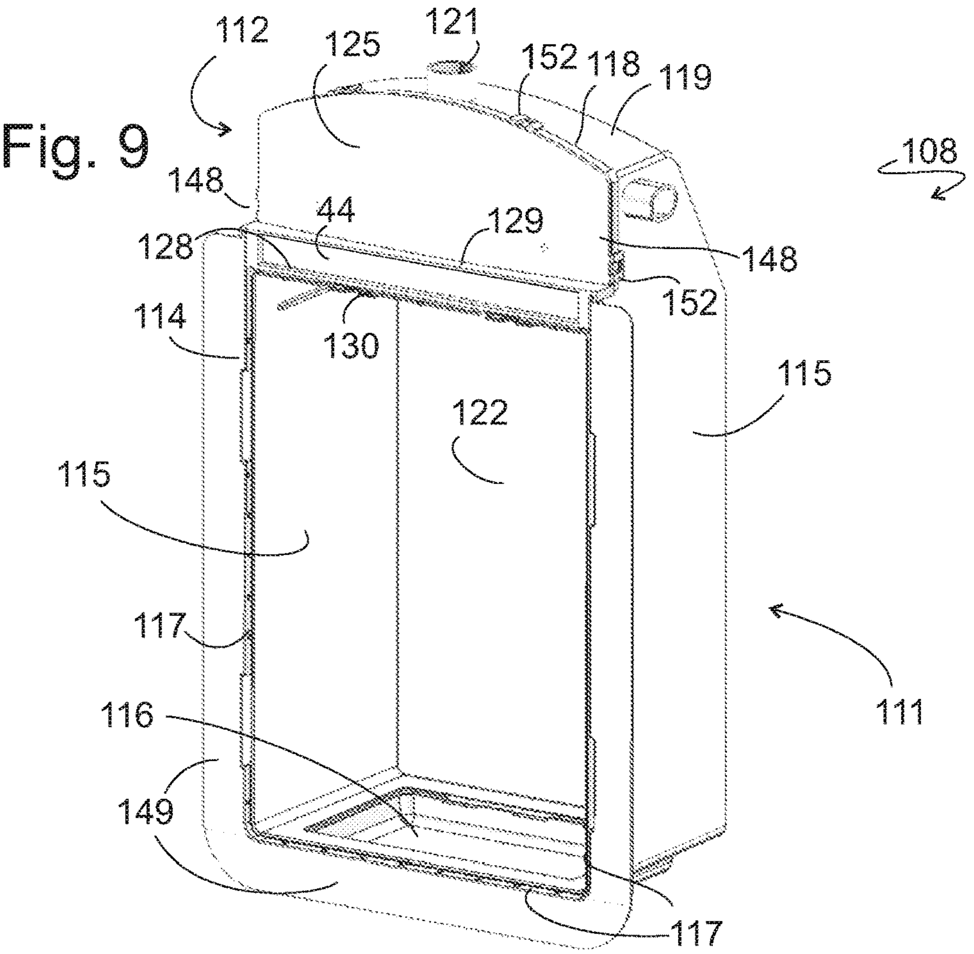
FIG. 9 is a perspective view of a dispenser housing according to a second embodiment.

FIG. 9 is a perspective view of a dispenser housing 108 according to a second embodiment of the invention. Generally, reference numerals of components of the second embodiment are derived from their counterparts in the first embodiment by adding 100. The housing 108 contains a main part 111 and a filling part 112. Similar to the first embodiment shown in FIG. 2, the main part 111 has an approximately cuboid shape containing substantially flat rear and side walls 122, 115, 115, a floor plate 116 and a ceiling 119, and a front edge 118 of the ceiling 119 is recessed with respect to front edges 114 of the side walls 115 and of the floor plate 116. The front edges 114 contain a groove 117 that is to accommodate angled edge strips 46 of outer shell 6 extending along lower and lateral edges of opening 7, as shown in FIG. 8, and flanges 149 that rest on an inner side of outer shell 6 when the dispenser housing is mounted in an appliance door 3.

A cutout 148 is formed in an upper front corner of each sidewall 115, so that the flanges 149 and grooves 117 do not extend up to the ceiling 119 but only along a lower portion of the sidewalls 115.

The filling part 112 contains an upright wall panel 125. The wall panel 125 can be cylindrically curved, with a convex side facing the outer shell 6, so that a gap 137 (see FIG. 11) between the outer shell 6 and the wall panel 125 is narrowest in the middle of the gap 137 and widens to both sides, approaching the cutouts 148.

The gap 137 is open at both sides and at the top, along front edge 118. At its bottom, the gap 137 is delimited by at least one web or ridge 128, 129 projecting from the wall panel 125 and resting at the inner side of the outer shell 6. A groove 130 for accommodating the edge strip 35 formed at an upper edge of opening 7 is provided in ridge 128. As in the first embodiment, a preformed insulation body 44 can be accommodated in the cavity delimited between the two horizontally extending ridges 128, 129 and the sidewalls 115.

Figure 10:
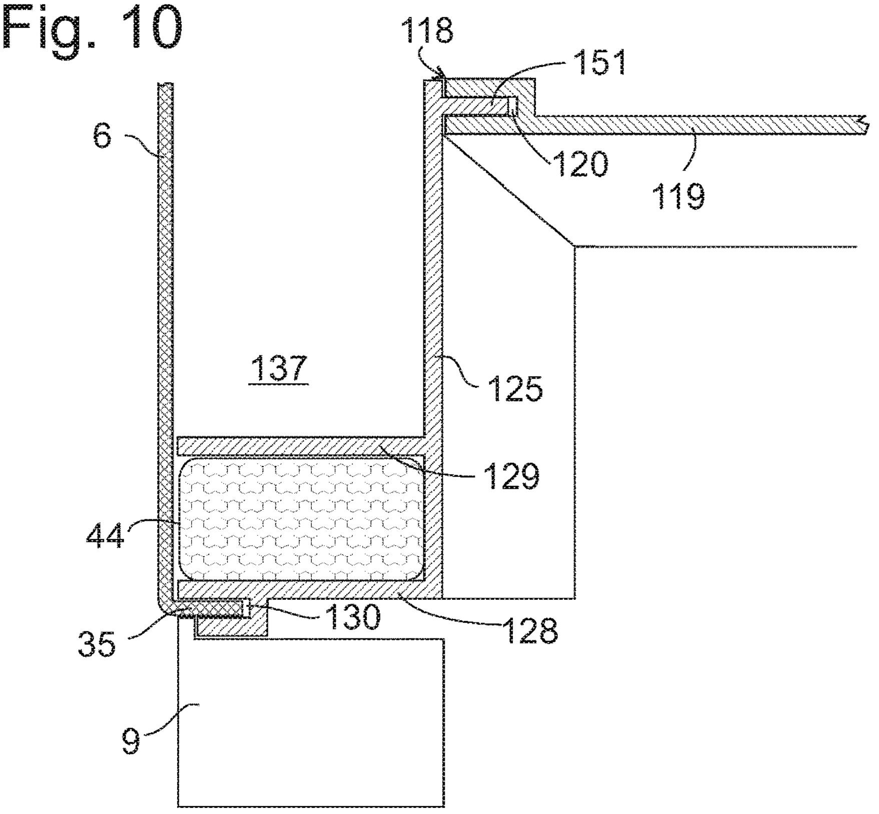
FIG. 10 is a vertical sectional view through the upper edge of the opening in the outer shell of the door and the area surrounding it according to the second embodiment.

The vertical section through the filler part 112 and its vicinity shown in FIG. 10 is therefore quite similar to FIG. 6, the main difference being that the filler part 112 lacks the ventilation mandrel of FIG. 6.

Figure 11:
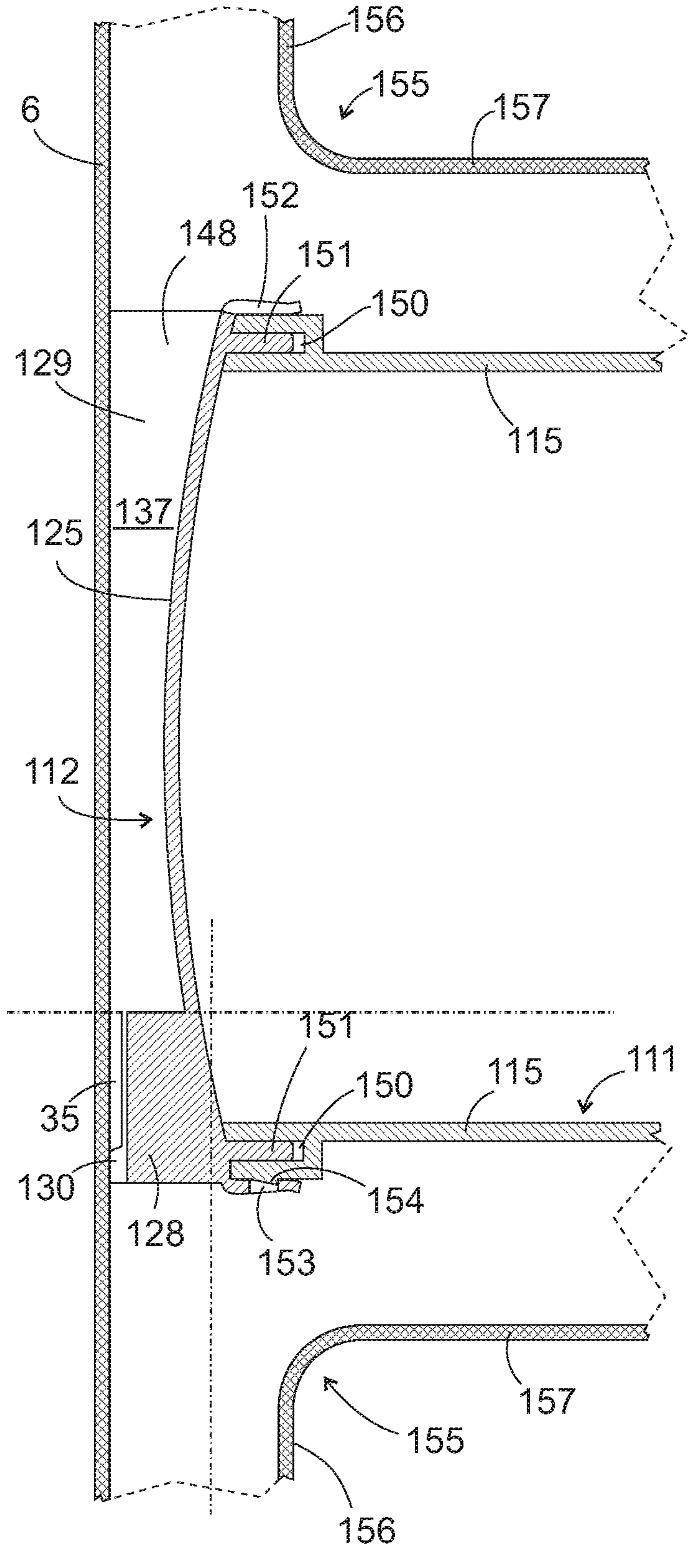
FIG. 11 is a partial horizontal cross sectional view of the refrigerator door at the level of the filling part according to the second embodiment.

FIG. 11 illustrates a partial horizontal section of door 3. The section plane is mostly located above the opening 7 of outer shell 6 and extends through the curved wall panel 125 of filling part 112; in a lower left corner of FIG. 11, the section plane extends within horizontal ridge 128, showing part of the groove 130 formed at a forward edge of the ridge 128, and of an upper edge strip 35 of outer shell 6 received in the groove 117.

A foam-tight tongue- and groove connection between the filler part 112 and the main part 111 contains a groove 150 in the front edge of each sidewall 115, facing the cutout 148, a web 151 extending along lateral and upper edges of the wall panel 125 and facing away from the outer shell 6, and a plurality of holding brackets 152. In a lower right corner of FIG. 11, the section plane extends through one of these holding brackets 152. The holding brackets 152 are tabs that extend along an outer side of the sidewalls 115 or of the ceiling 119 and have a central opening 153 engaged by a wedge-shaped projection 154 of the sidewall 115 which locks the filling part 112 to the main part 111 when the web 151 is inserted into the groove 150.

A rear wall 155 of the door 3 has portions 156 parallel to the outer shell 6 and portions 157 parallel to the sidewalls 115. When during assembly of the door 3 foam is injected into the cavity between the outer shell 6 and the rear wall 155, and is allowed to expand therein, it will enter the gap 137 from both sides, through the cutouts 148, and air can escape upwards from the gap 137. While the foam is still expanding, and air is escaping freely from the cavity through some vent hole, not shown, the pressure of the foam is close to atmospheric pressure. When the foam has filled the cavity but is not allowed to escape through the vent hole, pressure of the foam rises. In order to prevent bloating of the door 3, the door 3 is constrained in a mold while the foam is expanding and for some time afterwards. Waiting for the foam to cure completely would take several hours, therefore the door is released from the mold before that, and the mold is re-used before the foam is completely cured and set. A remaining tendency of the foam to expand and to exercise pressure on the outer shell 6 is largest in the regions adjacent to the sidewalls 115, the ceiling 119 and the floor plate 116 since the thickness of the foam layer measured perpendicular to outer shell 6 is highest there. Since the foam is not yet completely cured then, foam can be displaced, and the pressure may spread, into the gap 137. It was observed that in the first embodiment, the fact that the gap 37 is shielded laterally by the sidewalls 15, the pressure may not spread sufficiently into the gap 37, so that the camber of the outer shell in front of the gap 37 may be different from that in its vicinity. Such an inhomogeneity may become visible, in particular if the outer shell is reflecting, by distorting specular images of objects. In the second embodiment, the fact that the gap 137 is wide open to both sides via the cutouts 148 favors spreading of the pressure into the gap 137, thus avoiding a distortion of specular images if the outer shell 6 has a glossy, reflecting surface.

The following is a list of reference numerals used in the above description of the invention with reference to the drawing figures:

1 Refrigerator
2 Dispenser
3 Door
4 Door
5 Drawer
6 Outer shell
7 Opening
8 Dispenser housing
9 Operating component
10 Operating paddle
111 Main part
112 Filling part
13 Filling part
114 Front edge
115 Side wall
116 Floor plate
117 Groove
118 Front edge
119 Ceiling
120 Groove
121 Passage
122 Rear wall
23 Hole
24 Projection
125 Wall panel
26 Ridge
27 Ridge
128 Ridge
129 Ridge
130 Groove
31 Tongue
323 Flange
333 Tongue
34 Ventilation mandrel
35 Edge strip
36 Edge strip
137 Gap
38 Upper section
39 Lower section
40 Edge
41 Operating component
42 Ventilation Passage
43 Front surface
44 Insulation body
45 Latching projection
46 Edge strip
47 Filler tube
148 Cutout
149 Flange
150 Groove
151 Web
152 Holding bracket
153 Opening
154 Projection
155 Rear wall
156 Portion of rear wall
157 Portion of rear wall

The invention claimed is:

1. A refrigerator, comprising:

an outer shell having an opening formed therein; and a dispenser for at least one of ice or liquid and having a dispenser housing covering said opening in said outer shell of the refrigerator, said dispenser housing delimiting a dispenser recess extending outward and upward over an upper edge of said opening, said dispenser housing being assembled from a main part having a rear wall, opposing side walls and a ceiling with a front edge, said main part extending from a lower edge of said opening along said rear wall to said front edge of said ceiling of said dispenser housing, said side opposing side walls each having a respective front edge with a flange extending there along, said opposing sidewalls each have a respective cutout in an upper front corner thereof, said flanges terminating at said cutout, said dispenser housing further having a filling part extending behind said outer shell from said front edge of said ceiling to said upper edge of said opening, said filling part having a web and a wall panel offset from said web, said web being flush with said flanges and extending between said flanges, said filling part having releasable attachments to said main part at said sidewalls and at said front edge of said ceiling.

2. The refrigerator according to claim 1, further comprising an operating component mounted in said dispenser housing adjacent to said upper edge of said opening.

3. The refrigerator according to claim 1, wherein said wall panel delimits said dispenser recess and is separated from said outer shell by a gap.

4. The refrigerator according to claim 3, wherein said web is a plurality of webs that extend to said outer shell.

5. The refrigerator according to claim 4, wherein one of said webs extends over an entire width of said wall panel and divides said gap into an upper, open-ended section and a lower section bounded on all sides.

6. The refrigerator according to claim 3, further comprising foam and said gap is at least partially filled with said foam.

7. The refrigerator according to claim 6, wherein said filling part has a ventilation passage leading into said dispenser recess.

8. The refrigerator according to claim 7, further comprising a mandrel projecting from said wall panel into said gap, said ventilation passage extends inside said mandrel.

9. The refrigerator according to claim 3, further comprising foam and said gap is at least partially filled with said foam.

10. The refrigerator according to claim 3, wherein a prefabricated insulation body is inserted into said gap.

11. The refrigerator according to claim 1, wherein said wall panel has a convex side facing said gap.

12. The refrigerator according to claim 1, further comprising holding brackets carried by said wall panel, said holding brackets engaging said sidewalls.

13. The refrigerator according to claim 1, wherein:

said filling part has a groove formed therein; and said outer shell has an edge strip angled on said upper edge of said opening and engages into said groove of said filling part.

14. The refrigerator according to claim 1, wherein:

said main part has a groove formed therein; and said outer shell has an edge strip angled on a lateral or lower edge of said opening and said edge strip is accommodated in said groove of said main part.

15. The refrigerator according to claim 1, wherein said main part and said filling part are connected by means of a tongue-and-groove joint.

16. The refrigerator according to claim 15, wherein an insertion direction of said tongue-and-groove joint is perpendicular to said outer shell.

17. The refrigerator according to claim 15, wherein:

said filling part has a tongue;

said main part has a linear groove formed therein; and said outer shell has an edge strip accommodated in said linear groove in a lower area and said tongue of said filling part is accommodated in an upper area of said linear groove.

18. The refrigerator according to claim 15, wherein said tongue-and-groove joint has a tongue and a groove formed therein, one of said tongue and said groove of said tongue-and-groove joint is formed on a side of said wall panel that faces away from said outer shell.

19. The refrigerator according to claim 1, wherein said wall panel delimits said dispenser recess and is separated from said outer shell by a gap, said gap is narrowest in a middle of the gap and widens toward both said opposing sidewalls.

20. A refrigerator, comprising:

an outer shell having an opening formed therein; and a dispenser for at least one of ice or liquid and having a dispenser housing covering said opening in said outer shell of the refrigerator, said dispenser housing delimiting a dispenser recess extending outward and upward over an upper edge of the said opening, said dispenser housing being assembled from a main part having a rear wall, opposing side walls and a ceiling with a front edge, said main part extending from a lower edge of said opening along said rear wall to said front edge of said ceiling of said dispenser housing, said dispenser housing further having a filling part extending behind said outer shell from said front edge to said upper edge of said opening, said filling part having a wall panel delimiting said dispenser recess and being separated from said outer shell by a gap, said wall panel having a convex side being convex between said opposing sidewalls on a side facing said gap said gap being narrowest in a middle of the gap and widening toward both said opposing sidewalls.

* * * * *